(12) United States Patent
Kellerman et al.

(10) Patent No.: US 10,009,603 B2
(45) Date of Patent: *Jun. 26, 2018

(54) METHOD AND SYSTEM FOR ADAPTIVE VIEWPORT FOR A MOBILE DEVICE BASED ON VIEWING ANGLE

(71) Applicant: Avago Technologies General IP (Singapore) Pte. Ltd., Singapore (SG)

(72) Inventors: Marcus Kellerman, San Diego, CA (US); Xuemin Chen, Rancho Santa Fe, CA (US); Samir Hulyalkar, Newtown, PA (US); Ilya Klebanov, Thornill (CA)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 376 days.

This patent is subject to a terminal disclaimer.

(21) Appl. No.: 14/312,379

(22) Filed: Jun. 23, 2014

(65) Prior Publication Data

US 2015/0015671 A1 Jan. 15, 2015

Related U.S. Application Data

(63) Continuation of application No. 12/619,461, filed on Nov. 16, 2009, now Pat. No. 8,762,846.

(51) Int. Cl.
*H04N 9/00* (2006.01)
*H04N 13/04* (2006.01)
(Continued)

(52) U.S. Cl.
CPC ......... *H04N 13/0484* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS 6,351,273 B1 * 2/2002 Lemelson ............ G06F 3/0485
704/271
7,113,618 B2 9/2006 Junkins et al.
(Continued)

FOREIGN PATENT DOCUMENTS

WO WO-2007/138394 10/2007

OTHER PUBLICATIONS

EPO Communication dated Mar. 18, 2011 in Application No. 10014093.8-2202.

*Primary Examiner* — Mohammed Rahaman
(74) *Attorney, Agent, or Firm* — Foley & Lardner LLP

(57) ABSTRACT

A 2D and/or 3D video processing device comprising a camera and a display captures images of a viewer as the viewer observes displayed 2D and/or 3D video content in a viewport. Face and/or eye tracking of viewer images is utilized to generate a different viewport. Current and different viewports may comprise 2D and/or 3D video content from a single source or from different sources. The sources of 2D and/or 3D content may be scrolled, zoomed and/or navigated through for generating the different viewport. Content for the different viewport may be processed. Images of a viewer's positions, angles and/or movements of face, facial expression, eyes and/or physical gestures are captured by the camera and interpreted by face and/or eye tracking. The different viewport may be generated for navigating through 3D content and/or for rotating a 3D object. The 2D and/or 3D video processing device communicates via wire, wireless and/or optical interfaces.

20 Claims, 5 Drawing Sheets

(51) Int. Cl.
*G06F 3/01* (2006.01)
*G06F 3/0481* (2013.01)
*G06F 3/0485* (2013.01)

(52) U.S. Cl.
CPC ........ *G06F 3/0485* (2013.01); *G06F 3/04815* (2013.01); *G06F 2203/04806* (2013.01)

(56) References Cited

U.S. PATENT DOCUMENTS

| | | |
|---|---|---|
| 7,591,558 B2 | 9/2009 | Wezowski et al. |
| 2002/0015064 A1 | 2/2002 | Robotham et al. |
| 2003/0052965 A1* | 3/2003 | Junkins .................. G06F 3/011 348/42 |
| 2003/0218638 A1* | 11/2003 | Goose .................... G01C 21/20 715/850 |
| 2005/0059488 A1* | 3/2005 | Larsen .................... A63F 13/10 463/36 |
| 2006/0256133 A1* | 11/2006 | Rosenberg ............ G06Q 30/02 345/619 |
| 2006/0256140 A1* | 11/2006 | Turner ................... G09B 9/307 345/690 |
| 2006/0290663 A1 | 12/2006 | Mitchell |
| 2007/0064982 A1 | 3/2007 | Licato et al. |
| 2007/0197909 A1 | 8/2007 | Kariathungal et al. |
| 2007/0279591 A1* | 12/2007 | Wezowski .............. G06F 3/013 351/208 |
| 2008/0100612 A1 | 5/2008 | Dastmalchi et al. |
| 2008/0120141 A1 | 5/2008 | Kariathungal et al. |
| 2008/0130950 A1 | 6/2008 | Miklos et al. |
| 2010/0002002 A1 | 1/2010 | Lipsky et al. |
| 2010/0125799 A1 | 5/2010 | Roberts et al. |
| 2010/0275122 A1 | 10/2010 | Buxton et al. |
| 2010/0328428 A1 | 12/2010 | Booth et al. |
| 2011/0072355 A1 | 3/2011 | Carter et al. |

* cited by examiner

METHOD AND SYSTEM FOR ADAPTIVE VIEWPORT FOR A MOBILE DEVICE BASED ON VIEWING ANGLE

CROSS-REFERENCE TO RELATED APPLICATIONS/INCORPORATION BY REFERENCE

This application is a continuation of U.S. application Ser. No. 12/619,461, filed Nov. 16, 2009, entitled "METHOD AND SYSTEM FOR ADAPTIVE VIEWPORT FOR A MOBILE DEVICE BASED ON VIEWING ANGLE", assigned to the assignee of this application, and which is hereby incorporated by reference herein in its entirety.

This application makes reference to:
U.S. Provisional Patent Application Ser. No. 61/287,624 which was filed on Dec. 17, 2009;
U.S. Provisional Patent Application Ser. No. 61/287,634 which was filed on Dec. 17, 2009;
United States Non-Provisional patent application Ser. No. 12/554,416 which was filed on Sep. 4, 2009;
United States Non-Provisional patent application Ser. No. 12/546,644 which was filed on Aug. 24, 2009;
United States Non-Provisional patent application Ser. No. 12/578,048 which was filed on Oct. 13, 2009;
U.S. Provisional Patent Application Ser. No. 61/287,653 which was filed on Dec. 17, 2009;
U.S. Provisional Patent Application Ser. No. 61/242,644 which was filed on Sep. 15, 2009;
United States Non-Provisional patent application Ser. No. 12/545,679 which was filed on Aug. 21, 2009;
United States Non-Provisional patent application Ser. No. 12/560,554 which was filed on Sep. 16, 2009, now U.S. Pat. No. 8,428,122, issued Apr. 23, 2013;
United States Non-Provisional patent application Ser. No. 12/560,578 which was filed on Sep. 16, 2009, now U.S. Pat. No. 8,300,881, issued Oct. 30, 2012;
United States Non-Provisional patent application Ser. No. 12/560,592 which was filed on Sep. 16, 2009, now U.S. Pat. No. 8,472,625, issued Jun. 25, 2013;
United States Non-Provisional patent application Ser. No. 12/604,936 which was filed on Oct. 23, 2009, now U.S. Pat. No. 8,704,932, issued Apr. 22, 2014;
U.S. Provisional Patent Application Ser. No. 61/287,668 which was filed on Dec. 17, 2009;
United States Non-Provisional patent application Ser. No. 12/573,746 which was filed on Oct. 5, 2009;
United States Non-Provisional patent application Ser. No. 12/573,771 which was filed on Oct. 5, 2009;
U.S. Provisional Patent Application Ser. No. 61/287,673 which was filed on Dec. 17, 2009;
U.S. Provisional Patent Application Ser. No. 61/287,682 which was filed on Dec. 17, 2009;
United States Non-Provisional patent application Ser. No. 12/605,039 which was filed on Oct. 23, 2009, now U.S. Pat. No. 8,300,087, issued Oct. 30, 2012;
U.S. Provisional Patent Application Ser. No. 61/287,689 which was filed on Dec. 17, 2009; and
U.S. Provisional Patent Application Ser. No. 61/287,692 which was filed on Dec. 17, 2009.

Each of the above stated applications is hereby incorporated herein by reference in its entirety.

FIELD OF THE INVENTION

Certain embodiments of the invention relate to communication systems. More specifically, certain embodiments of the invention relate to an adaptive viewport for a mobile device based on a viewing angle.

BACKGROUND OF THE INVENTION

In 3D or 2D video and/or still systems, an image is presented in a display device, for example in a handheld device, a television, a monitor, a camera and/or a gaming console. Most video broadcasts, nowadays, utilize video processing applications that enable broadcasting video images in the form of bit streams that comprise information regarding characteristics of the image to be displayed. Video applications may utilize various interpolation and/or rate conversion functions to present content comprising still and/or moving images on a display.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an adaptive viewport for a mobile device based on a viewing angle, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for an adaptive viewport for a mobile device based on a viewing angle. In various embodiments of the invention, a 2D video and/or 3D video processing device may be operable to capture one or more images of a viewer as the viewer observes 2D video and/or 3D video content that is displayed in a current viewport on the device. In this regard, the 2D and/or 3D content may comprise still, moving, textual and/or graphics 2D video and/or 3D video content. In an exemplary embodiment of the invention, the 2D video and/or 3D video processing device may be a mobile or handheld device. The 2D video and/or 3D video processing device may perform face and/or eye tracking on the captured images of the viewer and may generate a different viewport based at least on information derived from the face and/or the eye tracking. The different viewport may comprise different and/or partially different 2D video and/or 3D video content than the current viewport based on the face and/or eye tracking. The different viewport may be displayed.

In this regard, the 2D video and/or 3D video processing device may comprise a camera and a 2D video and/or 3D video display. The current viewport and/or the different viewport may comprise different and/or partially different portions or views of a single source of 2D video and/or 3D video content. Alternatively, the different viewport and the current viewport may comprise 2D video and/or 3D video content from different sources. A source of currently available 2D video and/or 3D video content and/or a different source of 2D video and/or 3D video content may be scrolled, zoomed and/or navigated through for generating the different viewport. The 2D video and/or 3D video content for the generated different viewport may be processed. Images of one or more positions, angles and/or movements of a viewer's face, facial expression, eyes and/or other physical gestures of a viewer's body may be captured by a camera. The captured images may be interpreted by the face and/or eye tracking for scrolling, zooming and/or navigating beyond the current viewport. The different viewport comprising different and/or partially different 2D video and/or 3D video content based on the face and/or eye tracking may be generated for navigating through 3D video content and/or rotating a 3D object. The 2D video and/or 3D video processing device may be operable to communicate via a wire interface, a wireless interface and/or an optical interface. In this manner, a viewer may modify and/or control one or more viewports for display in a video processing device based on the face and/or the eye tracking.

Figure 1:
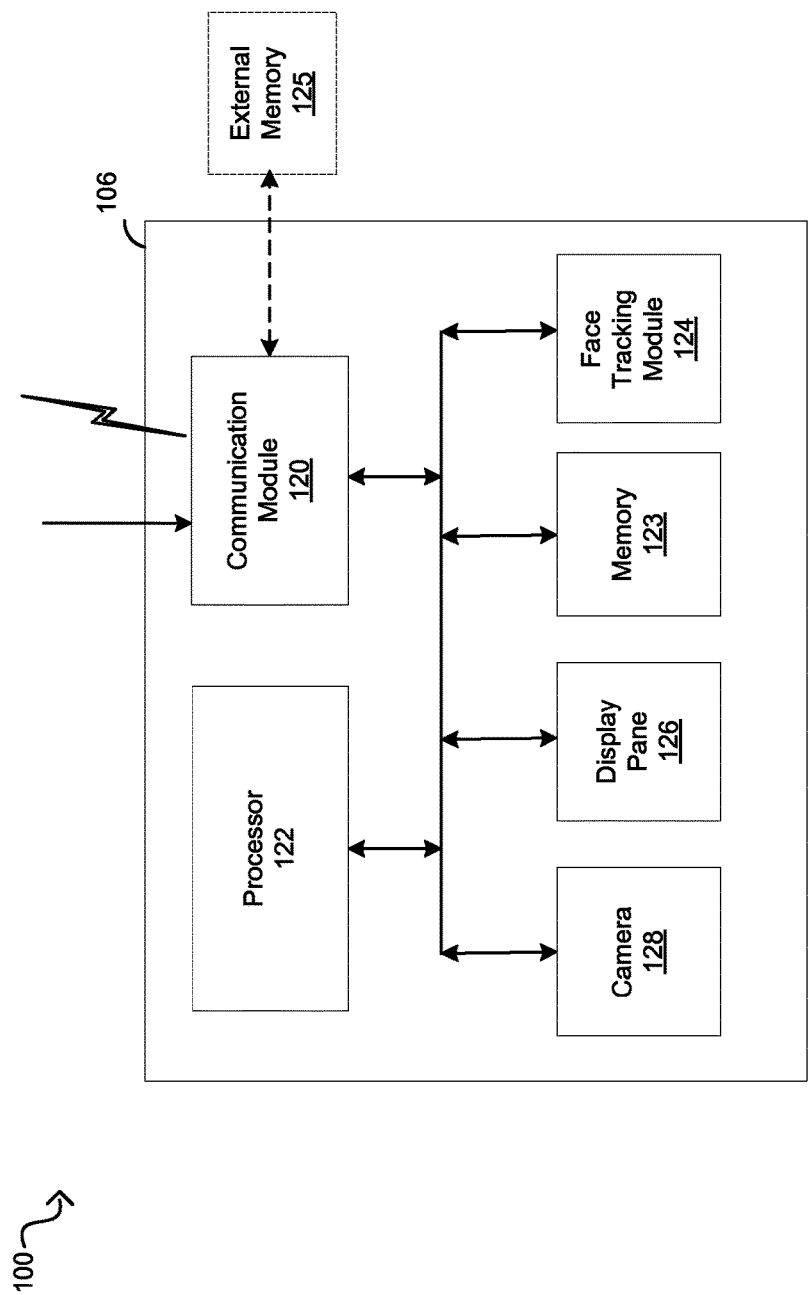
FIG. 1 is a block diagram illustrating an exemplary mobile device that is operable to display and/or process various portions of an image or a page based on face and/or eye tracking of a viewer of the display.

FIG. 1 is a block diagram illustrating an exemplary mobile device that is operable to display and/or process various portions of an image or a page based on face and/or eye tracking of a viewer of the display, in accordance with an embodiment of the invention. Referring to FIG. 1, there is shown a mobile display device 106 that may comprise a communication module 120, a processor 122, memory 123, an optional external memory 125, a face and/or eye tracking module 124, a display panel 126, and a camera 128.

The mobile display device 106 may comprise suitable logic, circuitry, interfaces and/or code that may be operable to sense a viewer's orientation of observation and may be operable to adapt a viewport based on sensing a viewer's attempts to view various portions of an image or page. For example, the viewer may attempt to see beyond edges of a displayed portion of an image or page. The viewport may comprise a portion or a specified window within an image or page that is currently displayed by the mobile display device 106. For example, a source of content for the viewport may comprise all content available to the mobile display device 106 for a particular image, page, frame and/or corresponding 3D frames. The mobile display device 106 may be operable to display entire content of an image, page, frame and/or corresponding 3D frames and/or may be operable to enlarge and/or display various portions of the entire content. In this regard, the mobile display device 106 may have a small screen or display panel 126 and may enlarge selected areas of an image or page for viewing. Although a mobile display device 106 is described for FIG. 1, the invention is not so limited. In this regard, various embodiments of the invention may comprise any suitable display device or any suitable device comprising a display.

The mobile display device 106 may be operable to utilize face and/or eye tracking to determine when a viewer is looking for content that may be outside the boundaries of what is currently displayed on the screen. For example, the face and/or eye tracking may analyze and/or interpret one or more images of a viewer of the display panel 126 and may determine where or at what the viewer intends to look. In this regard, the face and/or eye tracking may analyze one or more images of the viewer and may determine where the viewer is looking. Movement, position and/or angle, for example, of the viewer's eyes, face, head, facial features and/or various parts of the body may be analyzed and/or interpreted to determine where the viewer is looking. The viewer's direction of gaze and/or angle of view, for example, may indicate that a different aspect of an image may be desired by the viewer. For example, the face and/or eye tracking may determine by the viewer's eye position and/or angle of eyes and/or face that the viewer would like to scroll to an area of an image that is beyond the edge of a portion of the image that is displayed in a current viewport. In this instance, the mobile display device 106 may modify what is displayed in the viewport and may display the portion of the image that the viewer attempts to see. Moreover, the mobile display device 106 may be operable to enlarge areas of content for display and/or otherwise process the content in accordance with a viewer's observational behavior. The mobile display device 106 may be a 2D or 3D, wireless or tethered device such as a mobile phone, a media player, a computer, a television, a digital camera, a geo-location device and/or a gaming device, however, the invention is not limited in this regard.

The communication module 120 may comprise suitable logic, circuitry and/or code that may be operable to send and/or receive signals via a wired, optical and/or a wireless signal. The communication module 120 may support a plurality of interfaces. For example, the communication module 120 may be operable to support cellular, satellite, wireless LAN or WiFi wireless technologies. Moreover, the communication module 120 may be operable to support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound (I2S) interface, an inter-integrated circuit (I2C) bus interface, a universal serial bus (USB) interface, a Bluetooth interface, a ZigBee interface, an IrDA interface, and/or a wireless USB (W-USB) interface.

The processor 122 may comprise suitable logic, circuitry, interfaces and/or code that may be operable to control and/or configure one or more modules within the mobile display device 106 and/or may be operable to communicate with other devices via the communication module 120. The processor 122 may be operable to control the camera 128, for example, in order to capture useful face and/or eye tracking information. The processor 122 may retrieve and/or store content data, instructions and/or parameters, for example, from and/or to the memory 123 and/or the optional external memory 125 via the communications module 120, for example. Furthermore, the processor 122 may be operable to receive and/or process face and/or eye tracking information from the face and/or eye tracking module 124.

In this regard, the processor 122 may be operable process and/or edit content for display via the display panel 126 based on the face and/or eye tracking information. For example, the processor 122 may determine which portion of content within an image, page, frame and/or plurality of corresponding 3D frames, and/or how the content may be processed and/or displayed in a viewport based on the face and/or eye tracking information. In instances when the face and/or eye tracking information indicates that a viewer may want to look beyond a current image, page, frame and/or corresponding 3D frames to a new source of content, the processor 122 may be operable to turn to a new image, page, frame and/or a plurality of corresponding 3D frames. For example, a new page of text may be made available for viewing through various viewports within the new page.

In various embodiments of the invention, details of an image or a portion of the image may be enhanced or otherwise processed by the processor 122 based on face and/or eye tracking information from the face and/or eye tracking module 124. Furthermore, the processor 122 may utilize additional information to edit or modify content displayed in a viewport, for example, user information or information regarding the type of content that is being displayed, such as text, 2D or 3D images, moving or still images, photography and/or graphics. The processor 122 may process still or moving 3D video and/or 3D graphics content for display via the display panel 126, so that a viewer may see 3D content from various angles of view or at various depths. Furthermore, the processor 122 may enable a viewer to navigate through 3D images by processing the 3D content for display in a specified viewport based on face and/or eye tracking information from the face tracking module 124.

The camera 128 may comprise suitable logic, circuitry, interfaces and/or code that may be operable to sense and/or capture a viewer's face, eye and/or body while the viewer observes the display panel 126 on the mobile display device 106. For example, the camera 128 may be operable to sense visible light and/or infrared light. The camera 128 may be operable to communicate the sensed and/or captured information to the face and/or eye tracking module 124. For example, the camera 128 may be operable to capture facial features, movements, angle of a head, eyes or other parts of the body, expressions and/or positions. For example, eye characteristics, such as eye positions, eye movements, focal point or focus of gaze may be captured by the camera and communicated to the face and/or eye tracking module 128. Furthermore, proximity to the display panel 126 and/or angle of viewing or attitude of head or body may be captured and communicated to the face and/or eye tracking module 128. For example, data captured by the camera may indicate that a viewer is leaning in a certain direction so as to see beyond the edge of content within the current viewport or may be leaning in to see more depth or detail. In various embodiments of the invention, the data captured by the camera 128 may indicate that a viewer may be striving to see a new angle of a 3D object or to navigate through a 3D space.

The face and/or eye tracking module 124 may comprise suitable logic, circuitry, interfaces and/or code that may be operable to receive captured data from the camera 128 and may determine where or at what a viewer is presently looking at or where or at what the viewer intends to look at via the display panel 126. For example, the viewer's direction of gaze and/or angle of view may indicate that a different aspect of an image may be desired by the viewer. For example, the face and/or eye tracking module 124 may determine that a viewer would like to see something that is presently off of the screen. In this regard, based on the face and/or eye tracking information, the processor 122 may shift the viewport to a new position or may zoom in or out of content of a current image or page to expose the content sought by the viewer. For example, the face and/or eye tracking module 124 may enable scrolling, zooming and/or navigating available 2D or 3D content.

The display panel 126 may comprise suitable logic, circuitry, interfaces and/or code that may be operable to receive process and/or display 2D and/or 3D content. In this regard, any suitable display technology, for example, LCD, LED, or other display technology may be utilized in the mobile display device 106. With regard to 3D displays, the display panel 126 may be operable to utilize polarizing display techniques and/or time sequential display techniques and may communicate with 3D glasses for example.

In operation the mobile display device 106 may be operable to display 2D and/or 3D content via the display panel 126. The mobile display device 106 may utilize a viewport to display a portion of an image or a portion of a page via the display panel 126. In various embodiments of the invention, the mobile display device 106 may utilize the camera 128 to sense and/or capture an image of a viewer's behavior in observing and/or attempting to observe or navigate through a 2D or 3D image or page that may be displayed on the display panel 126. In this regard, the captured image of the viewer's behavior may be communicated to the face and/or eye tracking module 124. The face and/or eye tracking module 124 may determine where the viewer is looking or attempting to see based on the captured imagery and may determine how to display the available 2D and/or 3D content. For example, the face and/or eye tracking module 124 may determine that the viewport should be scrolled in a specified direction and/or modified to a specified zoom level. Furthermore, the face and/or eye tracking module 124 may determine that a 3D object may be rotated based on the viewer's behavior in observing 3D content. In some instances, the face and/or eye tracking module 124 may determine that a viewer is attempting to see something that is from another source of content outside of the currently available 2D or 3D content and may determine that a new image or page may be displayed. The face and/or eye tracking module 124 may communicate face and/or eye tracking information and/or information regarding modifications in displaying the 2D and/or 3D content to the processor 122. The processor 122 may process the 2D and/or 3D content to adapt the viewport in accordance with the information received from the face and/or eye tracking module 124 and may communicate the adapted content to the display panel 126.

Figure 2:
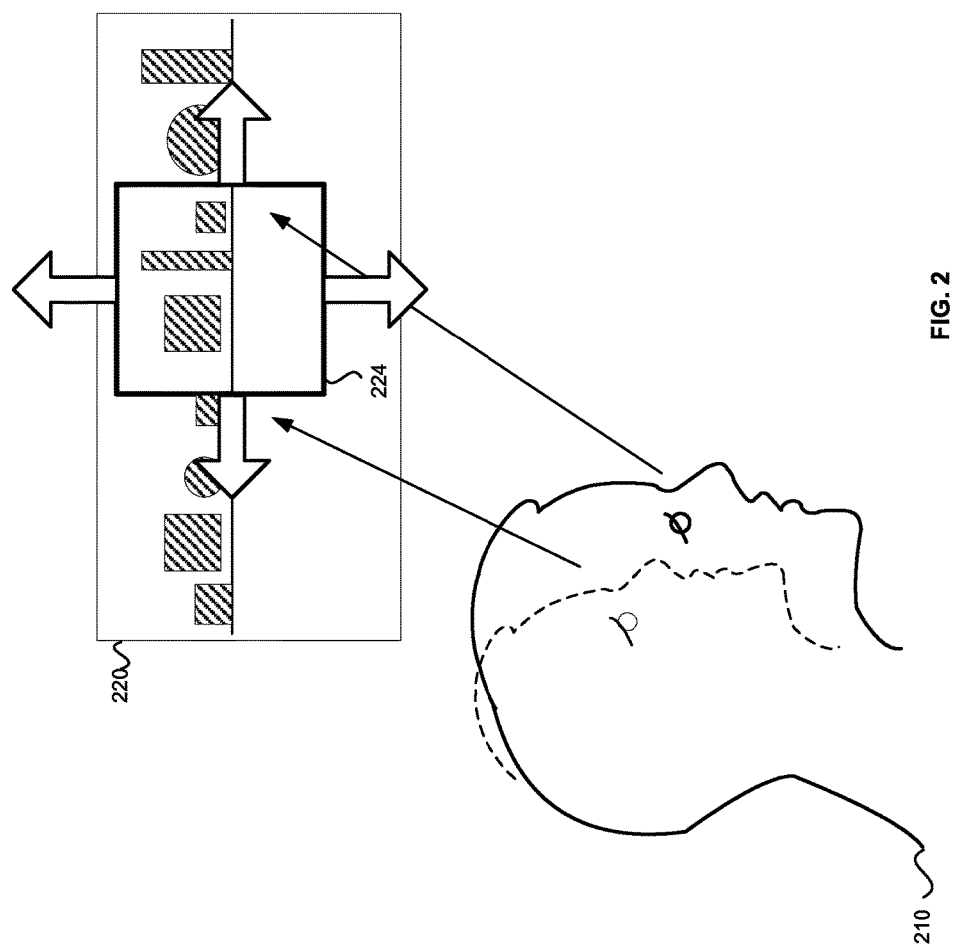
FIG. 2 is a block diagram that illustrates an exemplary window of display that may be shifted or modified depending on a viewer's position, viewing behavior and/or spatial orientation relative to a mobile display device, in accordance with an embodiment of the invention.

FIG. 2 is a block diagram that illustrates an exemplary window of display that may be shifted or modified depending on a viewer's position, viewing behavior and/or spatial orientation relative to a mobile display device, in accordance with an embodiment of the invention. Referring to FIG. 2, there is shown content available for display 220, a viewport 224, a viewer 210.

The content available for display 220 may comprise a source of 2D and/or 3D, still and/or motion, video, graphics and/or text for the viewport 224. In this regard, the invention is not limited to any specific type of content and may comprise any content that may be displayed on the mobile display device 106.

The viewport 224 may comprise a portion of the content available for display 220. The portion of the content displayed within the viewport may be processed by the processor 120 in accordance with various parameters, for example, the size of the display panel 126 and/or a zoom level of the displayed content. The view port 224 may be scrolled left, right, up, down and/or in and combination of directions. Furthermore, content displayed within the viewport may be enlarged in instances when the viewer indicates that a closer look at imagery and/or text, for example.

The viewer 210 may modify which portion of the content available for display 220 is within the viewport 224 and communicated via the display panel 126. In this regard, focal point and/or eye movements in a plurality of directions and/or positioning of the viewer's 210 head or body may indicate where within the content available for display 220 the viewer would like to be displayed and/or to view.

In operation, the viewer 210 may scroll the viewport 224 in a plurality of directions by looking in a direction of a desired portion of the content available for display 220. In this regard, eye movements, focal point and/or gestures of the head, face and/or body that may indicate what the viewer 210 may be interested in looking at may be captured by the camera 128 and processed by the face and/or eye tracking module 124. The face and/or eye tracking module 124 may interpret the captured viewer 210 information and may determine which area within the content available display 220 should be displayed in the viewport 224. The face and/or eye tracking module 124 may communicate the determined area to the processor 120. The processor 120 may receive information from the face and/or eye tracking module 124 and may process all or a portion of the content available for display in accordance with the specified view port 224 area. In this regard, the processor 120 may enhance and/or enlarge content for display in the viewport 224. In various embodiments of the invention, the face and/or eye tracking module 124 and/or the processor 122 may determine that a viewer is looking for content outside of the current content available for display and may select content from another source to display. For example, the viewer may be reading a column of text and as the viewer reaches the end of the text that is currently available for display, all or a portion of a next column of text may be displayed. Similarly, for example, a viewer of a viewport comprising all or a portion of a photograph may attempt to see what lies beyond the edge of the photograph. In this regard, all or a portion of another photograph may be displayed in the viewport that shows what lies beyond the previous photograph.

Figure 3:
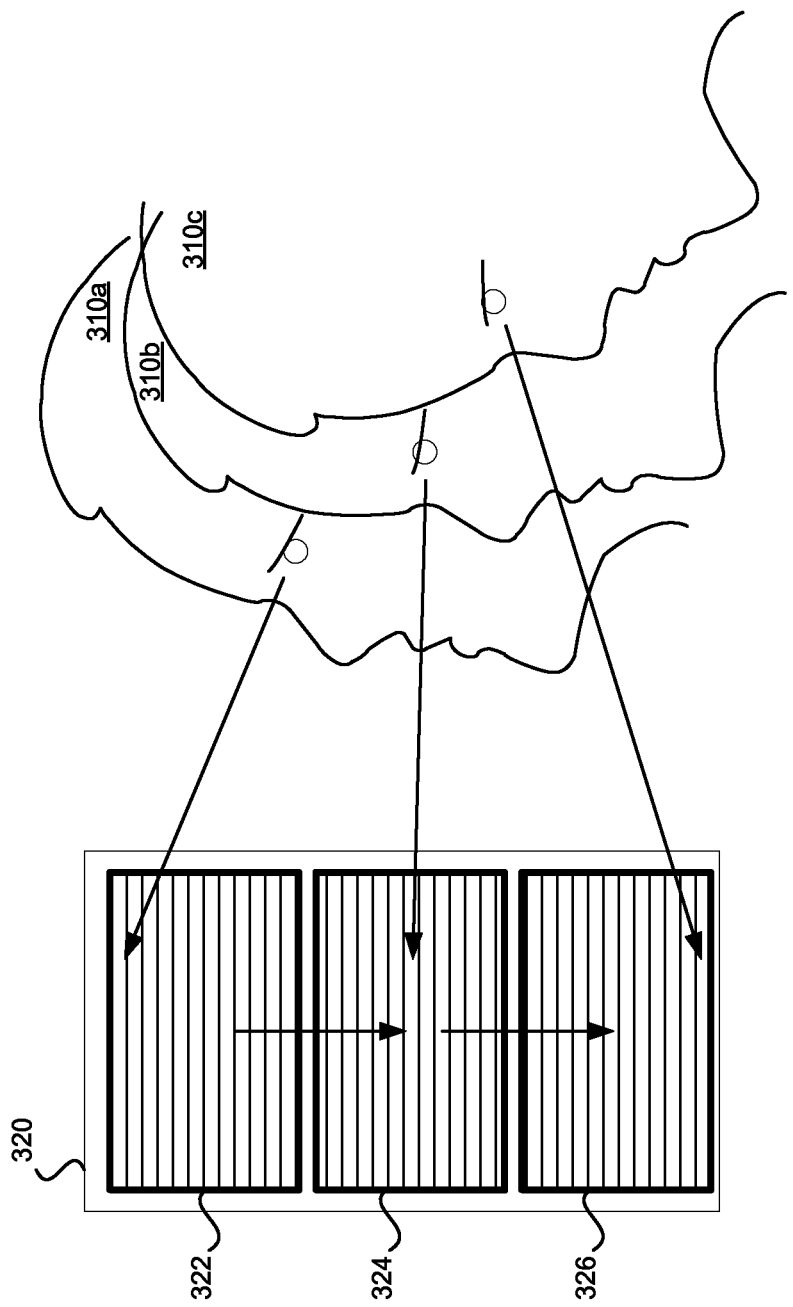
FIG. 3 is a block diagram that illustrates a plurality of exemplary viewport positions that may be shifted over text depending on a viewer's position, viewing behavior and/or spatial orientation relative to a mobile display device, in accordance with an embodiment of the invention.

FIG. 3 is a block diagram that illustrates a plurality of exemplary viewport positions that may be shifted over text depending on a viewer's position, viewing behavior and/or spatial orientation relative to a mobile display device, in accordance with an embodiment of the invention. Referring to FIG. 3, there is shown content available for display 320, three viewports 322, 324 and 326 and viewing positions 310a, 310b and 310c.

The content available for display 320 may be stored or streamed on the mobile display device 106. The viewports 322, 324 and/or 326 may indicate three portions of the content within the content available for display 320 that may be displayed by the display panel 126. For example, the content available for display may comprise, for example, a page of text and/or images.

In operation, a viewer may read the text and/or images from the content available for display 320 via various viewports displayed on the display panel 126. The viewports may be positioned so that they cover various portions of the content available for display 320. Content that may be displayed in a viewport may comprise the entire content available for display 320 and/or may be enlarged and cropped relative to the entire content available for display 320.

A viewer that may take the viewing position 310a may read a portion of text and/or view images that are displayed by the viewport 322. As the viewer reads and/or views the imagery, the viewer's position may change, for example, to the position 310b. At the viewing position 310b, focal point, eye movements and/or viewing behavior relative to the mobile display device 106 may indicate to the face and/or eye tracking module 124 that the viewer is ready to read text that is shown in the viewport 324. The processor 122 may generate a new viewport 324 that may comprise text and/or images from the content available for display 320 that may enable the viewer to continue reading. The processor 122 may communicate the new viewport 324 content to the display panel 126. Similarly, when the viewer reaches the position 310c, the viewer's focal point, eye movements and/or viewing behavior, as perceived by the face and/or eye tracking module 124, may indicate that the viewer would like to see a portion of the content 320 that is comprised within the viewport 326. The processor 122 may scroll the content available for display to the position of the viewport 326 and may communicate the content to the display panel 126. In this manner, a viewer may be able to scroll through reading material by performing the act of reading and or by looking at what is displayed in a viewport and/or looking for what is not displayed in the viewport. In this regard, the viewer may indicate that the viewer would like to see content beyond an edge of the viewport based viewing behavior, such as focal point, eye movement, head and/or body movements and/or positions relative to the mobile display device 106.

Figure 4:
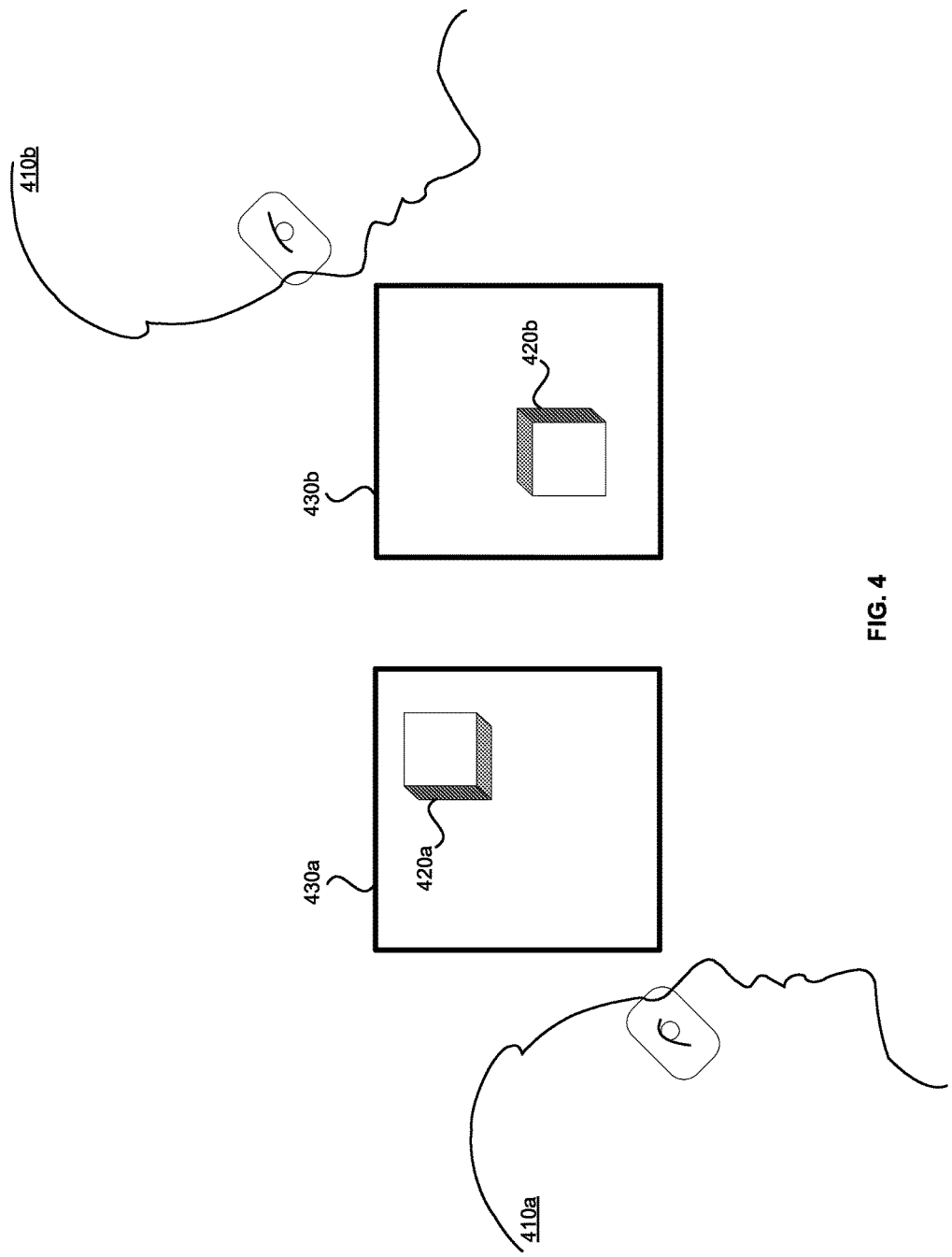
FIG. 4 is a block diagram that illustrates exemplary three dimensional navigation utilizing face and/or eye tracking, in accordance with an embodiment of the invention.

FIG. 4 is a block diagram that illustrates exemplary three dimensional navigation utilizing face and/or eye tracking, in accordance with an embodiment of the invention. Referring to FIG. 4, there is shown, a viewer position 410a, a 3D viewport 430a and a 3D object view 420a. In addition, there is shown a viewer position 410b, a 3D viewport 430b and a 3D object view 420b.

The 3D viewports 430a and 430b may comprise different portions of still and/or moving 3D video and/or graphics content from a single source of content that may be currently available for display. The single source of content that may be currently available for display may comprise corresponding stereoscopic left and/or right view 3D content and/or may comprise corresponding multi-view 3D video and or graphics content captured from more than two cameras or generated for more than two graphics frames from multiple views. The 3D viewports 430a and 430b may be displayed on the display panel 126 which may utilize any suitable display technology. For example, 3D viewports 430a and 430b may be displayed by the display 126 utilizing polarizing display techniques and a polarizing liquid crystal display (LCD). In another exemplary embodiment of the invention, the 3D viewports 430a and 430b may be displayed utilizing time sequential display techniques, for example, with a DLN rear projector display or a high frame rate plasma display. A viewer may need to wear 3D glasses to view the 3D content, for example, 3D polarizing glasses and/or 3D shutter glasses. Moreover, one or more of spectral filter techniques, anaglyph techniques, Pulfrich techniques and/or lenticular display techniques may be utilized. In this regard, the present invention is not limited to any specific display technology and/or glasses technology and may utilize any suitable type of 3D video and/or graphics display technology and/or 3D glasses technology.

The 3D viewports 430*a* and 430*b* may comprise a 3D object from content that is currently available for display that may be observed by a viewer from a plurality of positions and/or viewing angles. For example, from the viewer position 410*a*, the viewer may observe the 3D object view 420*a* in the 3D viewport 430*a*. At another time instant, the viewer may change to viewer position 410*b* and/or may look to see the 3D object from the object view 420*b*. The camera 128 and/or the face and/or eye tracking module 124 may observe and/or interpret the viewer's focal point, eye, face, head and/or body movements and may determine that the viewer wants to see the 3D object view 420*b*. The processor 122 may process an appropriate portion of the content available for display and may display the viewport 430*b* that may comprise the 3D object view 420*b*.

In various embodiments of the invention, the viewer's movements and/or positions may indicate to the face and/or eye tracking module 124, that the viewer is attempting to see something that is outside of the single source of content that is currently available for display. Accordingly, the processor 122 may retrieve a new source of content from which a new viewport may be selected for display. For example, the 3D content currently available for viewing may comprise an interior scene with an open door in it. A viewer may attempt to look around a corner into the open door. The face and/or eye tracking module may determine where the viewer is looking and may determine that the viewer is looking for something that may be outside of the content currently available for display. The processor 122 may determine that a different source of content comprising a scene of another room on the other side of the doorway may be made available for display. For example, the different source of the content may comprise a different set of corresponding stereoscopic left and/or right view 3D content and/or may comprise a different set of corresponding multi-view 3D video and or graphics content captured from more than two cameras or generated for more than two graphics frames from multiple views. The processor 122 may select a viewport from the new source of content available for display. The display 126 may display the selected viewport. In this manner, the viewer may navigate through 3D space based on face and/or eye tracking.

In operation, the mobile display device 106 may utilize the camera 128 to sense and/or capture a viewer's behavior when observing or navigating a 3D image or page that may be displayed on the display panel 126. In this regard, the face and/or eye tracking module 124 may determine that the viewport 430*a* should be scrolled in a specified direction and/or modified to a specified zoom level that is shown in the viewport 430*b*. Furthermore, the face and/or eye tracking module 124 may determine that a 3D object may be rotated based on the viewer's behavior in observing 3D content. In some instances, the face and/or eye tracking module 124 may determine that a viewer is attempting to see something that is outside of the currently available source of 3D content and may determine that a new image, page, frame and/or plurality of corresponding 3D frames may be utilized as a new source for the viewport 430*b*. The face and/or eye tracking module 124 may communicate face and/or eye tracking information and/or information regarding modifications in displaying the 3D content to the processor 122. The processor 122 may process the 3D content to adapt the viewport 430*b* in accordance with the information received from the face and/or eye tracking module 124 and may communicate the adapted content of viewport 430*b* to the display panel 126.

Figure 5:
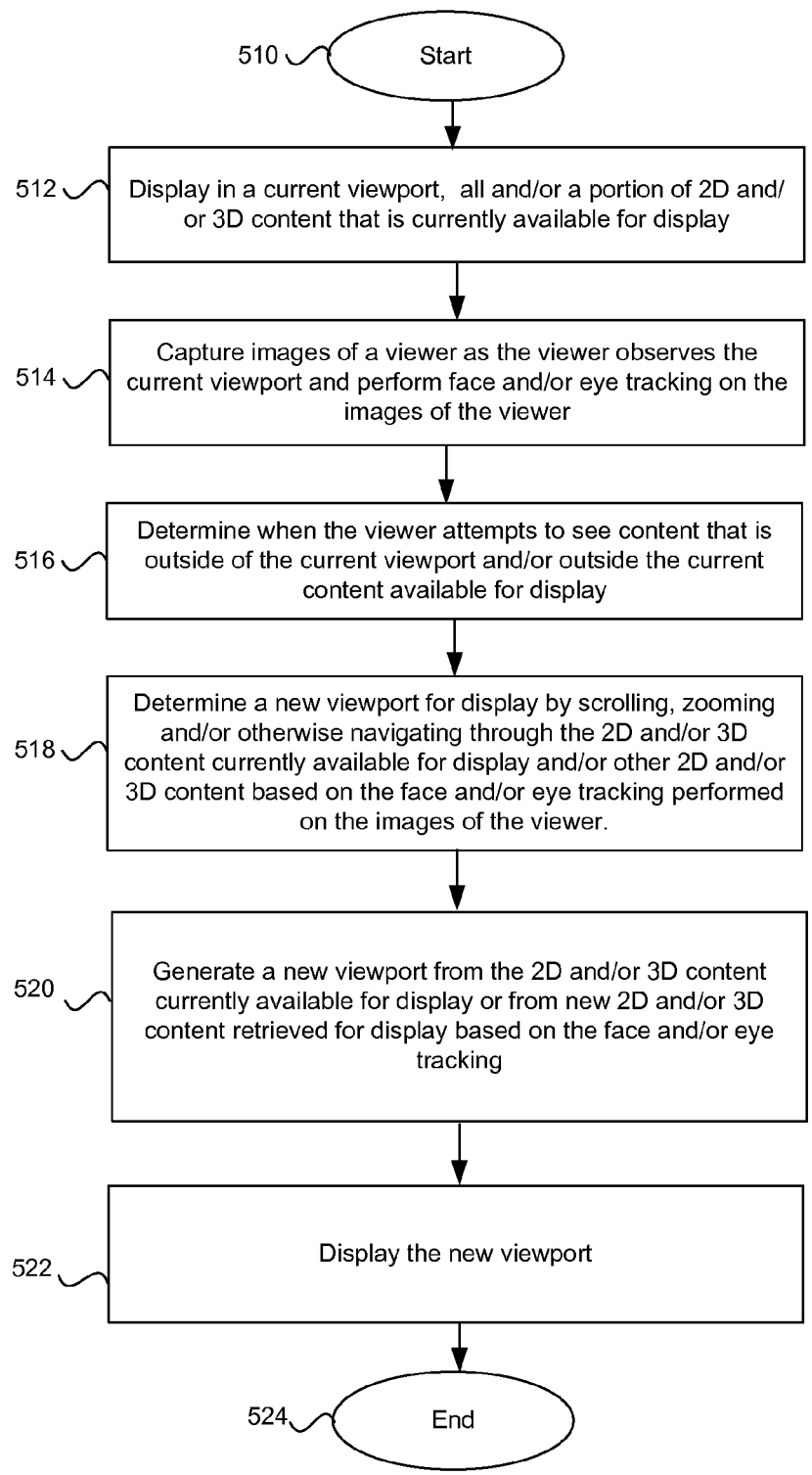
FIG. 5 is a flow chart illustrating exemplary steps for adapting a viewport for a mobile device based on face and/or eye tracking, in accordance with an embodiment of the invention.

FIG. 5 is a flow chart illustrating exemplary steps for adapting a viewport for a mobile device based on face and/or eye tracking, in accordance with an embodiment of the invention. The exemplary steps may begin with step 510. In step 512, a current viewport, for example, the viewport 322 may be displayed by the mobile display device 106 via the display panel 126. The current viewport 322 may comprise all and/or a portion of 2D and/or 3D content that is currently available for display 320 in the mobile display device 106. In step 514, images of a viewer 310 as the viewer observes the current viewport 322 may be captured by the camera 128 and face and/or eye tracking may be performed on the captured images of the viewer by the face and/or eye tracking module 124. In step 516, the face and/or eye tracking module 124 may determine when the viewer 310 attempts to see content that is outside of the current viewport 322 and/or outside the current content available for display 320. In step 518, a new viewport for display 324 may be determined by scrolling, zooming and/or otherwise navigating through the content currently available for display 320 and/or other content based on the face and/or eye tracking performed on the images of the viewer. In step 520, the new viewport 322 may be generated from the content currently available for display 320 or from new 2D and/or 3D content retrieved for display in accordance with the face and/or eye tracking. In step 522, the new viewport 324 may be displayed by the display panel 126. The exemplary steps may end at step 524.

In an embodiment of the invention, the mobile display device 106 may be a 2D video and/or 3D video processing device. As a viewer observes 2D video and/or 3D video content that is displayed in a current viewport 322 on the mobile display device 106, the device may be operable to capture one or more images of the viewer, for example, the camera 128 may capture the viewer in the position 310*a*. The display device 106 may perform face and/or eye tracking by the face and/or eye tracking module 124 on the captured images and may generate a different viewport 324. The different viewport 324 may comprise different and/or partially different 2D video and/or 3D video content than the current viewport 322 based on the face and/or eye tracking. The different viewport 324 may be displayed by the display panel 126. In this regard, the display device 106 may comprise a camera 128 and a 2D and/or 3D display panel 126. The current viewport 320 and/or the different viewport 322 may comprise different and/or partially different portions of a single source of 2D video and/or 3D video content for example the single source of content currently available for display 320. Alternatively, the different viewport 322 and the current viewport 320 may comprise 2D video and/or 3D video content from different sources.

A source of currently available 2D video and/or 3D video content 320 and/or a different source of 2D video and/or 3D video content may be scrolled, zoomed and/or navigated through for generating the different viewport 322. The 2D video and/or 3D video content for the generated different viewport 322 may be processed, for example, to enhance the content for display in the viewport 322 and/or to reduce noise, for example. Images of one or more positions, angles and/or movements of a viewer's face, facial expression, eyes and/or other physical gestures of a viewer's body may be captured by the camera 128. The captured images may be interpreted by the face and/or eye tracking module 124 for scrolling, zooming and/or navigating beyond a current viewport, for example, the viewport 430*a*. The different viewport 430*b* comprising different and/or partially different 2D video and/or 3D video content, based on face and/or eye tracking, may be generated for navigating through 3D video content and/or for rotating a 3D object 420*a*. The display device 106 may be operable to communicate via one or more of a wire interface, a wireless interface and/or an optical interlace via the communication module 120. In this manner, a viewer may modify and/or control one or more viewports for display in the display device 106 based on face and/or eye tracking.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for adaptive viewport for a mobile device based on viewing angle.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    capturing, by one or more processors, one or more images of a viewer while the viewer observes a first set of one or more content images representing a first set of one or more contents;
    performing at least one of face tracking or eye tracking on the one or more images of the viewer to generate tracking data, the tracking data indicating a first content that the viewer is attempting to see;
    determining, by the one or more processors, whether the first content is within the first set of one or more contents;
    generating, by the one or more processors, a second set of one or more content images using the tracking data, the step of generating the second set of one or more content images comprising:
        modifying at least one image of the first set of content images in response to determining the first content is within the first set of one or more contents; and
        responsive to determining that the first content is not within the first set of one or more contents,
            determining at least one new content image that is not within the first set of content images and associated with the first content; and
            replacing at least one image of the first set of content images with the at least one new content image; and
    displaying the second set of one or more content images.

2. The method of claim 1, wherein the first set of content images and the second set of content images represent at least partially different portions of a single source of content.

3. The method of claim 1, wherein the first set of content images is from a first source of content, and the at least one new content image is from a second source of content, wherein the first source of content is different from the second source of content.

4. The method of claim 1, wherein generating the second set of content images comprises at least one of scrolling, zooming, or navigating through at least one of a source of currently available content or a different source of content.

5. The method of claim 1, wherein capturing the one or more images of the viewer comprises capturing images of at least one of one or more positions of a face of the viewer, one or more angles of the face of the viewer, one or more movements of the face of the viewer, a facial expression of the viewer, eyes of the viewer, or other physical gestures of a body of the viewer using a camera.

6. The method of claim 1, further comprising interpreting captured images of at least one of one or more positions of a face of the viewer, one or more angles of the face of the viewer, one or more movements of the face of the viewer, a facial expression of the viewer, eyes of the viewer, or other physical gestures of a body of the viewer for performing at least one of a scrolling operation, a zooming operation, or a navigating operation on the first set of content images.

7. The method of claim 1, wherein generating the second set of content images comprises navigating, based on the tracking data, through three-dimensional content by varying viewing angles or depths of view in the three-dimensional content.

8. A system comprising:
    circuitry configured to:
        capture one or more images of a viewer while the viewer observes a first set of one or more content images representing a first set of one or more contents;
        perform at least one of face tracking or eye tracking on the one or more images of the viewer to generate tracking data, the tracking data indicating a first content that the viewer is attempting to see;
        determine whether the first content is within the first set of one or more contents;
        generate a second set of one or more content images using the tracking data by:
            modifying at least one image of the first set of content images in response to determining the first content is within the first set of one or more contents;

replacing at least one image of the first set of content images with at least one new content image in response to determining the first content is not within the first set of one or more contents, wherein the at least one new content image is not within the first set of one or more content images and the at least one new content image is associated with the first content; and display the second set of one or more content images.

9. The system of claim 8, wherein the first set of content images and the second set of content images represent at least partially different portions of a single source of content.

10. The system of claim 8, wherein the second set of content images comprises content from a different source of content than the first set of content images.

11. The system of claim 8, wherein the circuitry is configured to generate the second set of content images by at least one of scrolling, zooming, or navigating through at least one of a source of currently available content or a different source of content.

12. The system of claim 8, wherein the circuitry is configured to capture images of at least one of one or more positions of a face of the viewer, one or more angles of the face of the viewer, one or more movements of the face of the viewer, a facial expression of the viewer, eyes of the viewer, or other physical gestures of a body of the viewer using a camera.

13. The system of claim 8, wherein the circuitry is further configured to interpret captured images of at least one of one or more positions of a face of the viewer, one or more angles of the face of the viewer, one or more movements of the face of the viewer, a facial expression of the viewer, eyes of the viewer, or other physical gestures of a body of the viewer for performing at least one of a scrolling operation, a zooming operation, or a navigating operation on the first set of content images.

14. The system of claim 8, wherein the circuitry is configured to navigate, based on the tracking data, through three-dimensional content by varying viewing angles or depths of view in the three-dimensional content.

15. A method comprising:

capturing, by one or more processors, one or more images of a viewer while the viewer observes a first viewport comprising a first set of one or more content images representing a first set of one or more contents;

performing at least one of face tracking or eye tracking on the one or more images of the viewer to generate tracking data, the tracking data indicating a first content that the viewer is attempting to see;

determining whether the first content is within the first set of one or more contents;

generating, by the one or more processors, a second viewport comprising a second set of one or more content images using the tracking data, the step of generating the second viewport comprising:

modifying at least one image of the first set of content images in response to determining the first content is within the first set of contents;

replacing at least one image of the first set of content images with at least one new content image in response to determining the first content is not within the first set of one or more contents, wherein the at least one new content image is not within the first set of one or more content images and the at least one new content image is associated with the first content; and displaying the second viewport.

16. The method of claim 15, wherein the first viewport and the second viewport represent at least partially different portions of a single source of content.

17. The method of claim 15, wherein the second viewport comprises content from a different source of content than the first viewport.

18. The method of claim 15, wherein generating the second viewport comprises at least one of scrolling, zooming, or navigating through at least one of a source of currently available content or a different source of content.

19. The method of claim 15, wherein capturing the one or more images of the viewer comprises capturing images of at least one of one or more positions of a face of the viewer, one or more angles of the face of the viewer, one or more movements of the face of the viewer, a facial expression of the viewer, eyes of the viewer, or other physical gestures of a body of the viewer using a camera.

20. The method of claim 15, further comprising interpreting captured images of at least one of one or more positions of a face of the viewer, one or more angles of the face of the viewer, one or more movements of the face of the viewer, a facial expression of the viewer, eyes of the viewer, or other physical gestures of a body of the viewer for performing at least one of a scrolling operation, a zooming operation, or a navigating operation on the first set of content images.

* * * * *